(12) United States Patent
Xu

(10) Patent No.: US 10,088,673 B2
(45) Date of Patent: Oct. 2, 2018

(54) 3D DISPLAY APPARATUS, METHOD, AND APPLICATIONS

(71) Applicant: DeepSee Inc., Irvine, CA (US)

(72) Inventor: Jing Xu, Irvine, CA (US)

(73) Assignee: DeepSee Inc., Irvine, CA (US)

( * ) Notice: Subject to any disclaimer, the term of this patent is extended or adjusted under 35 U.S.C. 154(b) by 0 days.

(21) Appl. No.: 15/440,487

(22) Filed: Feb. 23, 2017

(65) Prior Publication Data

US 2017/0269353 A1  Sep. 21, 2017

Related U.S. Application Data

(60) Provisional application No. 62/333,420, filed on May 9, 2016, provisional application No. 62/308,308, filed on Mar. 15, 2016.

(51) Int. Cl.
*G02B 26/08* (2006.01)
*G02B 27/22* (2018.01)
*G02B 3/00* (2006.01)
G02B 27/01 (2006.01)

(52) U.S. Cl.
CPC ....... *G02B 26/0875* (2013.01); *G02B 3/0006* (2013.01); *G02B 27/0172* (2013.01); *G02B 27/2214* (2013.01); *G02B 27/2228* (2013.01); G02B 2027/0129 (2013.01); G02B 2027/0136 (2013.01)

(58) Field of Classification Search
None
See application file for complete search history.

(56) References Cited

U.S. PATENT DOCUMENTS

| | | | |
|---|---|---|---|
| 5,642,227 A | 6/1997 | Rallison | |
| 8,508,851 B2 | 8/2013 | Miao et al. | |
| 2011/0075257 A1 | 3/2011 | Hua et al. | |
| 2013/0021658 A1 | 1/2013 | Miao et al. | |
| 2015/0262424 A1* | 9/2015 | Tabaka | G02B 27/0075 345/633 |
| 2016/0097930 A1* | 4/2016 | Robbins | G02B 27/0172 345/8 |

OTHER PUBLICATIONS

Hua, H. et al., 2001, An Ultra-light and Compact Design and Implementation of Head-Mounted Projective Displays, pp. 175-182, 2001, 0-7695-0948-7/01 IEEE.

* cited by examiner

*Primary Examiner* — Jennifer D. Carruth
(74) *Attorney, Agent, or Firm* — Bond, Schoeneck & King, PLLC; William Greener

(57) ABSTRACT

A 3D display apparatus and method that address the vergence-accommodation conflict. A display screen component includes a display screen pixel array adapted to display a display screen image, a microlens imaging component including an array of microlenses corresponding to the display screen pixel array that can form a virtual or a real image of the display screen image, and a controllable movement component coupled to the imaging component or the display screen, wherein the imaging component and the display screen are controllably movable relative to each other, further wherein upon a controlled movement of the imaging component relative to the display screen, a location of the virtual or the real image along an optical axis is controllably changed.

20 Claims, 11 Drawing Sheets

Resolvable pixels at best focus of camera

Blurred pixels at out of focus of camera

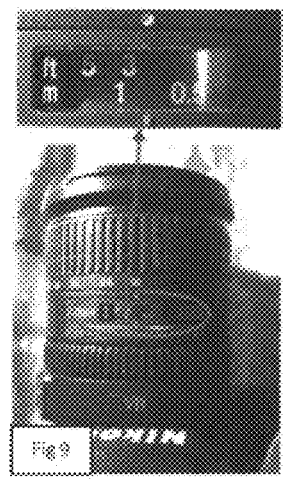 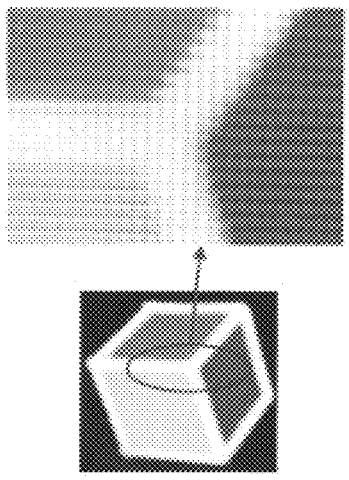 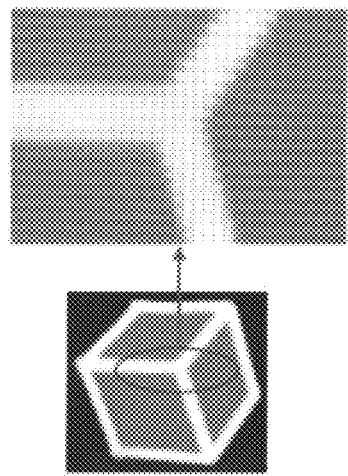
FIG. 9a                    FIG. 9b
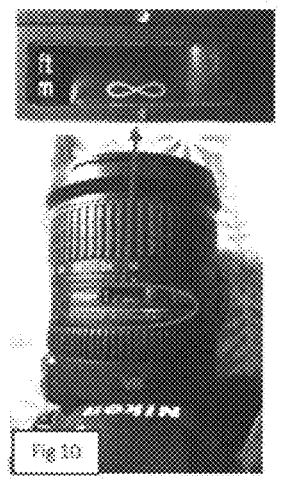 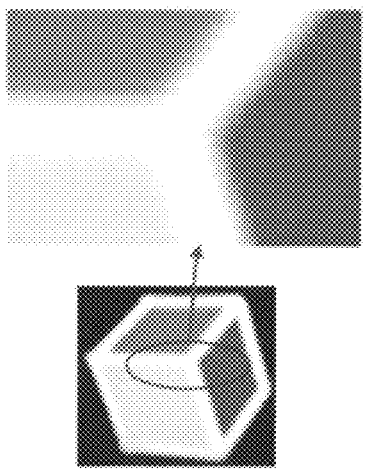 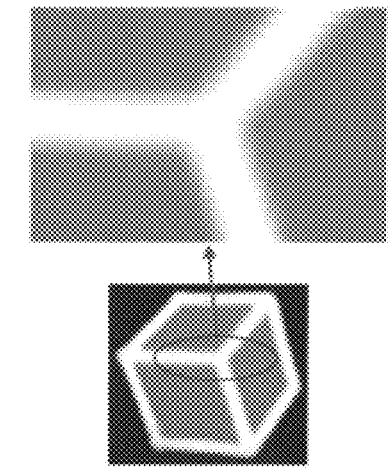
FIG. 10a                   FIG. 10b

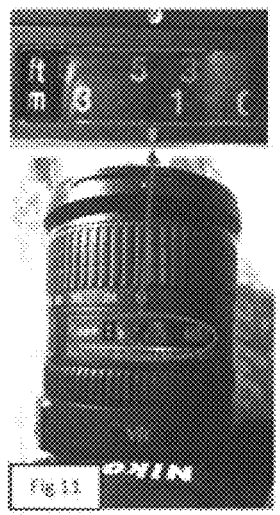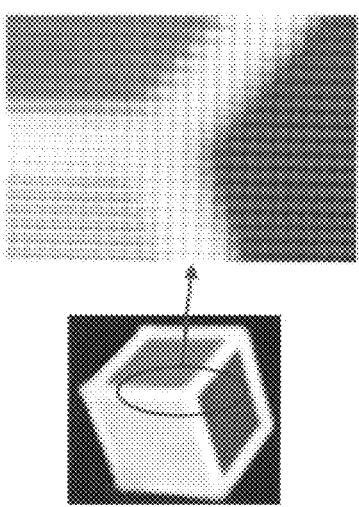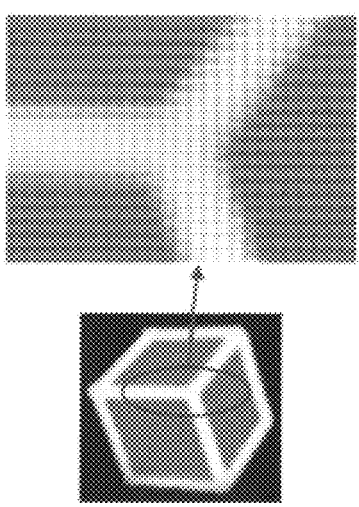
FIG. 11a                    FIG. 11b
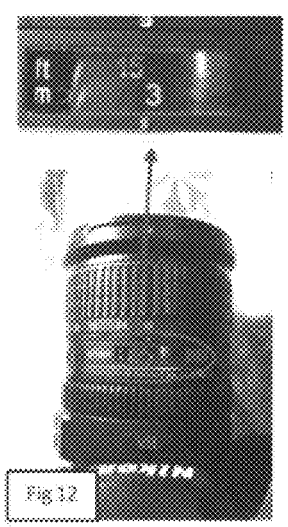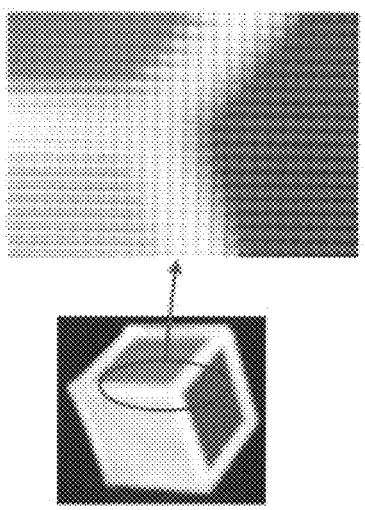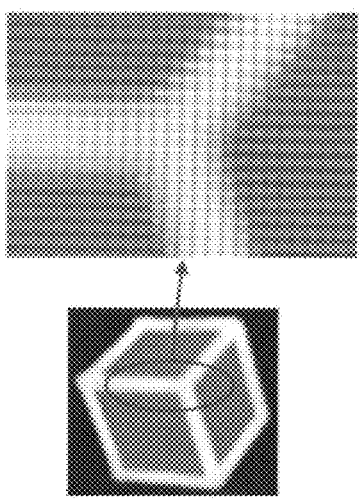
FIG. 12a                    FIG. 12b

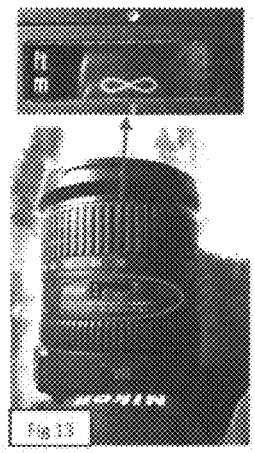 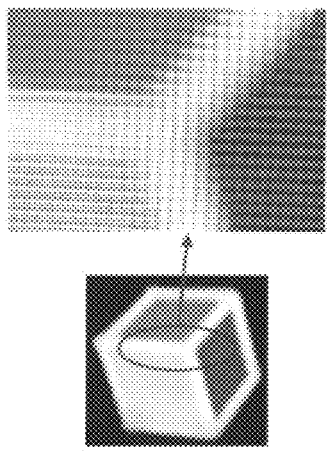 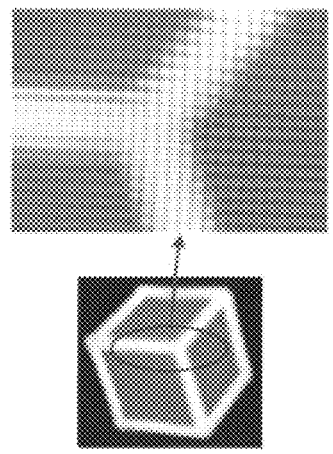
FIG. 13a
FIG. 13b
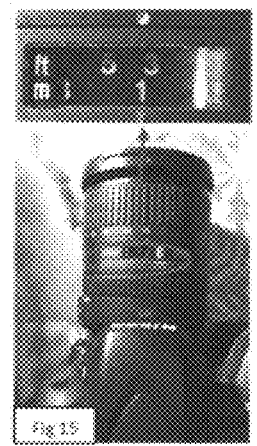 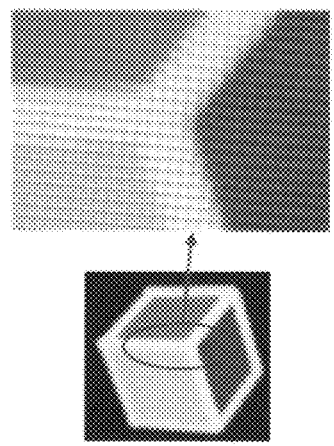 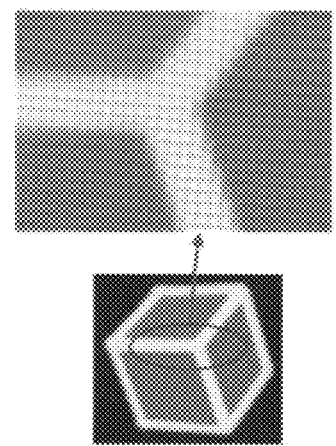
FIG. 15a
FIG. 15b

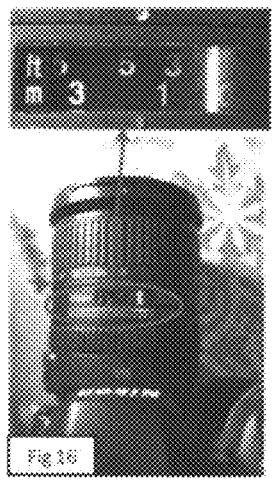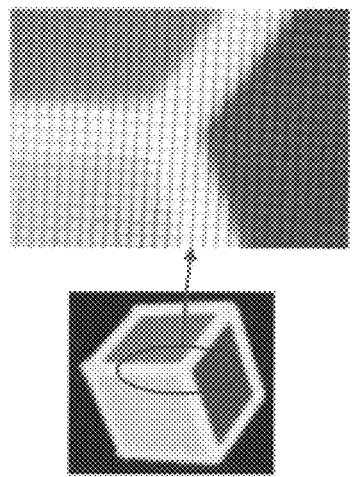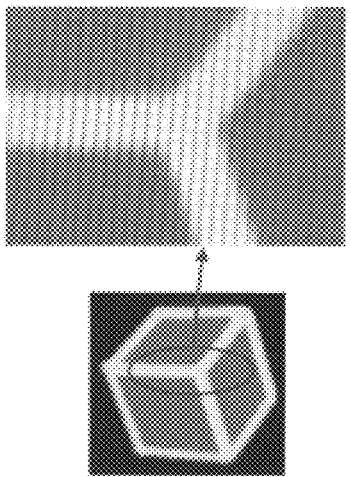
FIG. 16a　　　　　　　　FIG. 16b
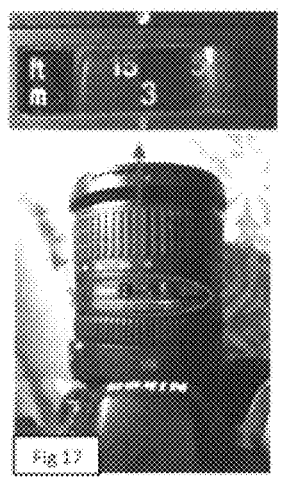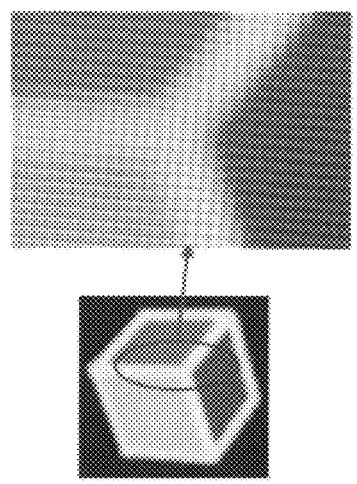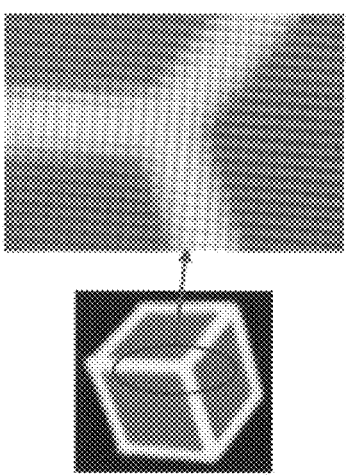
FIG. 17a　　　　　　　　FIG. 17b

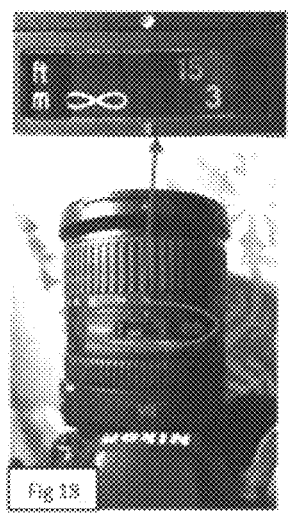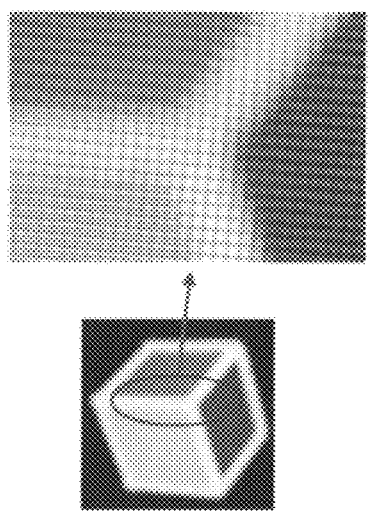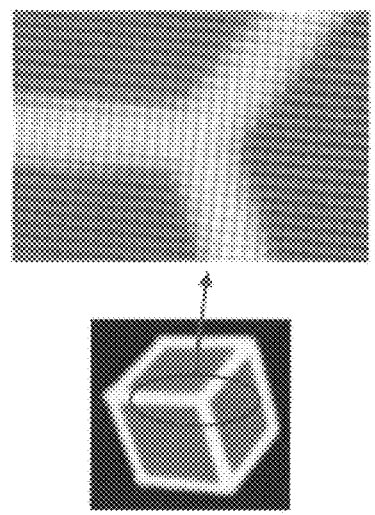
FIG. 18a　　　　　　　FIG. 18b

3D DISPLAY APPARATUS, METHOD, AND APPLICATIONS

RELATED APPLICATION DATA

The instant application claims priority to U.S. provisional application No. 62/308,308 filed on Mar. 15, 2016 and U.S. provisional application No. 62/333,420 filed on May 9, 2016, the subject matters of which are incorporated by reference herein in their entireties.

BACKGROUND

Aspects and embodiments of the invention most generally pertain to visual display apparatus and systems, image display methods, and applications. More particularly, aspects and embodiments are directed to 3D near-eye display systems for Virtual Reality (VR) and Augmented Reality (AR) systems, methods pertaining thereto, and applications thereof.

Conventional 3D near-eye displays for VR and/or AR applications use stereoscopic methods to realize 3D imaging effects by separately presenting two offset images to the left and right eyes of the viewer. Typically, one micro-display (e.g., OLED, LCOS, etc.) or portable display (such as a smartphone screen that is split into two sections, etc.) (hereinafter 'display') is used as an image source along with suitable optics to form a virtual image viewable by each eye. FIG. 1 shows an example of a Google Cardboard VR viewer wherein a smartphone screen is split into two sections to provide two offset images.

An image display is generally composed of an array of pixels (e.g., 1080×1200) as minimal display source elements. For VR applications, the display and optics are located in front of each eye to form the near-eye display. For AR applications, the display and optics are typically not directly located in front of each eye; rather, the virtual image is re-directed to the eye through a partial reflector (or diffractive element functioning as a partial reflector) so that the eye can also see the real world. FIGS. 2a and 2b, respectively, illustrate near-eye displays for one eye of a viewer for VR and AR applications.

During stereoscopic viewing the viewer is presented with two near-eye displays; one for the left eye and another for the right eye. Both eyes focus on each virtual screen, respectively, to see two offset images whose optical paths cross to form a 3D image. FIGS. 3a and 3b, respectively, illustrate differences between natural viewing and stereo viewing. In natural viewing, vergence and focal distance are equal. The viewer adjusts the vergence of the eyes to look at an object, and the eyes focus to sharpen the retinal image. Because of the tight correlation in natural viewing, vergence and accommodation are neurally coupled. Specifically, accommodative changes evoke changes in vergence (accommodative vergence), and vergence changes evoke changes in accommodation (vergence accommodation). In stereo viewing on a conventional stereo display, the focal distance is fixed at the distance from the eyes to the display screen, while vergence distance varies depending on the distance being simulated on the display. Thus a vergence-accommodation conflict is created when viewing a stereo display. To see the object clearly and without double vision the viewer must counteract the neural coupling between vergence and accommodation to accommodate to a different distance than the distance at which the eyes must converge. Visual fatigue and discomfort occur as the viewer attempts to adjust vergence and accommodation appropriately.

The literature describes a Zone of Comfort (ZoC) as a relationship between distance of vergence and distance to the screen (accommodation distance). Certain VR/AR applications such as, e.g., a computing platform suggest that the vergence distance of the 3D image should be less than 0.5 meter so that the viewer's hand can reach it easily. The ZoC suggests that the accommodation distance of the virtual screen should be less than one (1) meter for 0.5 meter comfort vergence distance. Currently available VR/AR devices either do not or cannot meet this requirement. The inventor has recognized the advantages and benefits provided by a solution to the vergence-accommodation problem, said solution being enabled by the invention claimed herein.

SUMMARY

An aspect of the invention is a 3D display apparatus. In a non-limiting, exemplary embodiment the 3D display apparatus includes a display screen component comprising a display screen pixel array adapted to display a display screen image; a microlens imaging component comprising an array of microlenses corresponding to the display screen pixel array disposed adjacent the display screen component such that the microlens imaging component can form a virtual or a real image of the display screen image; and a controllable movement component coupled to at least one of the imaging component and the display screen, wherein the imaging component and the display screen are controllably movable relative to each other, further wherein upon a controlled movement of the imaging component relative to the display screen, a location of the virtual or the real image along an optical axis is controllably changed. In various non-limiting, exemplary aspects the embodied apparatus may include some or all of the following features, limitations, and/or characteristics alone or in combination as one skilled in the art would understand:

wherein the display screen is in a fixed location and the microlens imaging component is movable;
  wherein the microlens imaging component is movable along an optical, z, axis in front of the display screen;
  wherein the microlens imaging component is movable in a plane, x-y, perpendicular to an optical, z, axis in front of the display screen;
wherein the microlens imaging component is in a fixed location and the display screen is movable;
  wherein the display screen is movable along an optical, z, axis behind the microlens imaging component;
  wherein the display screen is movable in a plane, x-y, perpendicular to an optical, z, axis behind the microlens imaging component;
wherein both the microlens imaging component and the display screen are movable;
  wherein the microlens imaging component is movable along an optical, z, axis in front of the display screen, and the display screen is movable in a plane, x-y, perpendicular to an optical, z, axis behind the microlens imaging component;
  wherein the microlens imaging component is movable in a plane, x-y, perpendicular to an optical, z, axis in front of the display screen, the display screen is movable along an optical, z, axis behind the microlens imaging component;
wherein each of the microlenses has a lateral dimension between 0.5× and 2× a lateral dimension of a single display pixel;

wherein each of the microlenses has a lateral dimension that is equal to the lateral dimension of a single corresponding display pixel;

wherein the pitch of the microlenses is equal to or larger than the lateral dimension of each of the microlenses.

An aspect of the invention is a near-eye display system. In a non-limiting, exemplary embodiment the near-eye display system includes a 3D display apparatus, comprising a display screen component comprising a display screen pixel array adapted to display a display screen image; a microlens imaging component comprising an array of microlenses corresponding to the display screen pixel array disposed adjacent the display screen component such that the microlens imaging component can form a virtual or a real image of the display screen image; and a controllable movement component coupled to at least one of the imaging component and the display screen, wherein the imaging component and the display screen are controllably movable relative to each other; and a viewing lens fixedly disposed adjacent the microlens imaging component, wherein a final virtual image of the display that is viewable by a viewer will be formed by the viewing lens at a controllably variable distance, $D_i$, from the viewing lens relative to a movable position of the microlens imaging component, where $D_i$ is the accommodation distance of the viewer's eye. In various non-limiting, exemplary aspects the embodied system may include some or all of the following features, apparatus, components, limitations, and/or characteristics alone or in combination as one skilled in the art would understand:

wherein the viewing lens is a positive lens system comprising at least a piece of positive lens including a Fresnel lens or a group of lenses to form a positive lens group;

wherein the movement of microlens imaging component along the z-axis is time modulated (z(t)) in the manner so that the corresponding final virtual images from the viewing lens can form a 3D image viewable by the viewer.

An aspect of the invention is a method for displaying an image. In a non-limiting, exemplary embodiment the method includes the steps of providing a near-eye display system, comprising a near-eye display apparatus, further comprising a display screen component comprising a display screen pixel array adapted to display a display screen image; a microlens imaging component comprising an array of microlenses corresponding to the display screen pixel array disposed adjacent the display screen component such that the microlens imaging component can form a virtual or a real image of the display screen image; and a controllable movement component coupled to at least one of the imaging component and the display screen, wherein the microlens imaging component and the display screen are controllably movable relative to each other; and a viewing lens fixedly disposed adjacent the microlens imaging component, so as to form a final virtual image of the display at a controllably variable distance, $D_i$, from the viewing lens; and moving the microlens imaging component relative to the display screen component to vary the distance, $D_i$, and thus controllably change the accommodation distance of the viewer's eye. In various non-limiting, exemplary aspects the embodied method may include some or all of the following steps, features, apparatus, components, limitations, and/or characteristics alone or in combination as one skilled in the art would understand:

further comprising time modulating the movement of microlens imaging component along the optical, z, axis (z(t)) in the manner so that the corresponding final virtual images from the viewing lens form a 3D image viewable by the viewer.

BRIEF DESCRIPTION OF THE DRAWINGS

FIG. 7b shows pictures taken with the camera at the best focus of the camera where the pixels (graininess) of the cubes in the pictures are resolvable when the pictures were zoomed in.

FIG. 9a shows a picture of the camera at focus distance of 0.75 m; FIG. 9b shows the best focused pictures (taken sequentially) of two cube targets—(left) and (right), through the Google Cardboard lens and the micro-lens array, in accordance with embodiments of the invention.

FIG. 10a shows a picture of the camera at ∞ focus; FIG. 10(b) shows that the pixels of the pictures are blurred with the camera lens focusing at infinity, which indicates that the camera lens was defocused and the virtual images of the cubes were not at infinity in accordance with embodiments of the invention.

FIG. 11a shows a picture of the camera at best focus with the microlens array 0.5 mm from the display screen; FIG. 11(b) shows pictures of the cubes through the Goggle cardboard lens and the micro-lens array, indicating that the virtual images of the targets were re-located to 1.5 m away from the camera (or viewer's eye) by moving the micro-lens array from the screen 0.5 mm.

FIG. 12a shows a picture of the camera at best focus with the microlens array 1.0 mm from the display screen; FIG. 12(b) shows pictures of the cubes through the Goggle cardboard lens and the micro-lens array, indicating that the virtual images of the targets were re-located to 4 m away from the camera (or viewer's eye) by moving the micro-lens array from the screen 1 mm.

FIG. 13a shows a picture of the camera at best focus at infinity with the microlens array 1.2 mm from the display screen; FIG. 13b shows pictures of the cubes through the Goggle cardboard lens and the micro-lens array, indicating that the virtual images of the targets were re-located to infinity by moving the micro-lens array from the screen 1.2 mm.

FIG. 15a shows a picture of the camera at best focus at 1 m; FIG. 15b shows pictures of the cubes through the Fresnel lens and the micro-lens array, indicating that the virtual image of the display screen was located at 1 m away from the camera (or viewer's eye).

FIG. 16a shows a picture of the camera at best focus at 1.5 m when the micro-lens array was positioned 0.5 mm away from the display screen; FIG. 16b shows pictures of the cubes through the Fresnel lens and the micro-lens array, indicating that the virtual image of the display screen was located at 1.5 m away from the camera (or viewer's eye).

FIG. 17a shows a picture of the camera at best focus at 3 m when the micro-lens array was positioned 1.0 mm away from the display screen; FIG. 17b shows pictures of the cubes through the Fresnel lens and the micro-lens array, indicating that the virtual image of the display screen was located at 3 m away from the camera (or viewer's eye).

FIG. 18a shows a picture of the camera at best focus at close to infinity when the micro-lens array was positioned 1.2 mm away from the display screen; FIG. 18b shows pictures of the cubes through the Fresnel lens and the micro-lens array, indicating that the virtual image of the display screen was located essentially at infinity from the camera (or viewer's eye).

DETAILED DESCRIPTION OF NON-LIMITING, EXEMPLARY EMBODIMENTS

Figure 4:
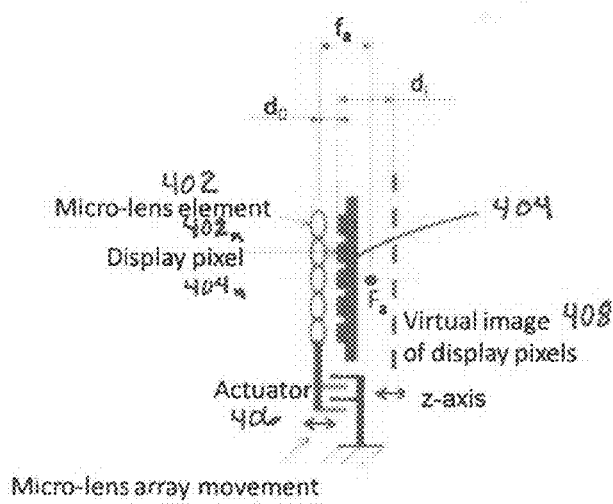
FIGS. 4 schematically illustrates a 3D display apparatus according to an exemplary embodiment of the invention.

Aspects and embodiments of the invention describe 3D near-eye display apparatus for VR and/or AR applications and methods that eliminate or mitigate accommodation and vergence conflict, and which may be used to generate true 3D images. Referring to FIG. 4, a micro-lens array 402 comprising micro-lens elements (or lenslets) $402_n$ is located in front of (to the left of) a display 404 including display pixels $404_n$. The micro-lens elements may all be the same or not. A precision actuator 406 is provided to move the micro-lens array 402 relative to the display 404. The actuator may be, e.g., one or more MEMS or silicon-based devices, piezo-based devices, memory alloy-based devices, VCM (Voice Coil Motor) or VCA (Voice Coil Actuator)-based devices, stepper motor-based devices, and others known in the art. The lateral dimensions of each micro-lens element, as well as the array pitch, are advantageously the same (e.g., 1 pixel) or may be a bigger (e.g., up to 2 pixels) or smaller (e.g., down to 0.5 pixel) than the lateral dimensions of each display pixel. For example, if each pixel's lateral (x by y) dimensions in an illustrative OLED micro-display are 10×10 μm, then each micro-lens element's dimensions could also be 10×10 μm (or up to 20×20 μm, or down to 5×5 μm). The micro-lens array is mounted on the actuator (or other appropriate movement device) to enable precise movement along the optical path (z) direction. Assuming the effective focal length of each lenslet is $f_a$, $F_a$ is the focal point of a lenslet along its own optical axis. The distance, $d_0$, between the display and micro-lens array may be larger than the focal length, $f_a$, of each lenslet for a real image, or smaller than $f_a$ for a virtual image of each display pixel that is formed by the lenslet in front of it. Here we only consider the case of a virtual image when $d_0 \le f_a$; then the virtual image 408 of the entire display pixel array is also formed at a distance, $d_i$, from the display through the lens array. With movement of the lens array, $d_0$ changes in the z-direction and the virtual image of the display pixel array also moves ($d_i$ changes). The relationships of location of each component in FIG. 4 are:

$$d_0 > f_a, \text{ or } d_0 \le f_a \qquad (1)$$

$$\frac{1}{d_0} + \frac{1}{d_0 + d_i} = \frac{1}{f_a} \qquad (2)$$

Figure 5A:
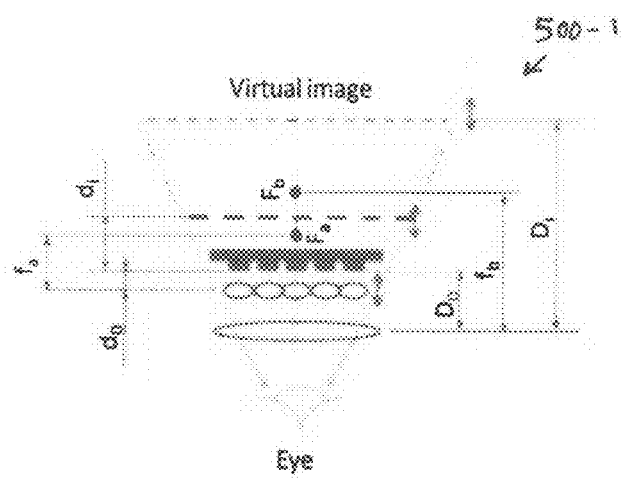
FIG. 5a schematically shows the position of device components in a 3D near eye display VR system.

When the display 404 is placed in the near-eye display system 500-1, 500-2, shown in FIG. 5 for (a) VR and (b) AR, with the movement of the micro-lens array 402, the location of the final virtual image that will be seen by the viewer also changes along the optical path direction, such that the accommodation distance of the viewer's eye also changes. FIG. 5a shows the position of each device/component in a VR system 500-1 that follows the relationships below, assuming the VR lens has an effective focal length of $f_b$ and the focal point is at $F_b$, its distance to the display is $D_0$, and the final virtual image of display is at distance $D_i$ from the VR lens.

$$D_0 + d_i \le f_b \qquad (3)$$

$$\frac{1}{D_i} + \frac{1}{D_0 + d_i} = \frac{1}{f_b} \qquad (4)$$

Figure 5B:
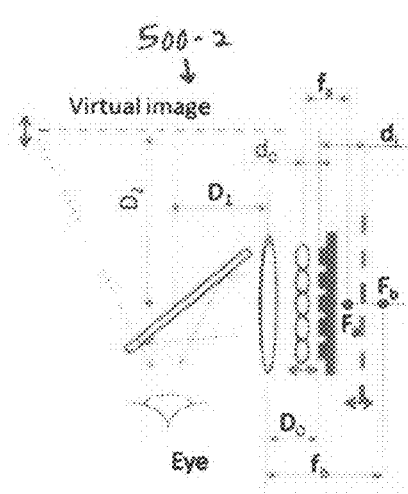
FIG. 5b schematically shows the position of device components in a 3D near eye display AR system, according to exemplary embodiments of the invention.

Equation (2) shows that when the micro-lens array is moved ($d_0$ changes), $d_i$ also changes, and $D_i$ also changes (Equation (4)), where $D_i$ is the accommodation distance of the viewer's eye if we ignore the distance between the viewer's eye to the VR lens since they are very close. In addition, due to the reciprocal relationship in Equations (2) and (4), if $d_0$ was set to be close to $f_a$ and $(D_0+d_i)$ close to $f_b$, then a small movement (e.g., two to several microns to several mm depending on $f_a$ or/and $f_b$) of the micro-lens array (small change of $d_0$) can cause a large change (e.g., fractions of up to 10s of m) in $D_i$. FIG. 5b shows the position of each device/component in an AR system 500-2 that will also follow the same relationships in Equations (1) to (4) with $D_0 = D_1 + D_2$.

Two experimental examples are presented below.
Experimental Verifications

Figure 1:
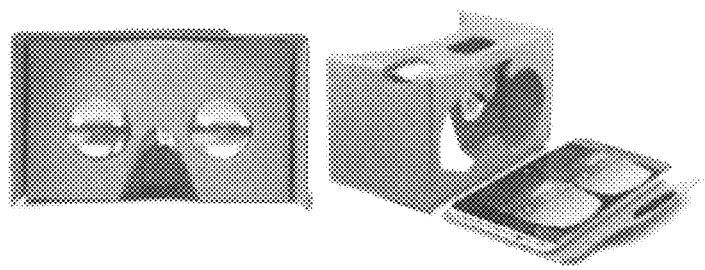
FIG. 1 shows an example of a Google Cardboard VR viewer wherein a smartphone screen is split into two sections to provide two offset images, as known in the art, FIGS. 2a and 2b, respectively, illustrate conventional near-eye displays for one eye of a viewer fog virtual reality (VR) and augmented reality (AR).

Optical imaging systems of some current commercial VR systems are very simple; they comprise just two identical positive lenses as VR lenses, one for each eye of the viewer, in front of a micro-display or smart phone screen that functions as the image source display (e.g., Google Cardboard VR system shown in FIG. 1). A lens from an off-the-shelf Google Cardboard VR system was chosen as the VR lens for the first verification experiment, whose results are shown below in Experiment I. Because some current VR systems also use Fresnel lenses as VR lenses for the viewer, an off-the-shelf Fresnel lens was used for the second verification experiment, whose results are presented in Experiment II below.

Figure 6:
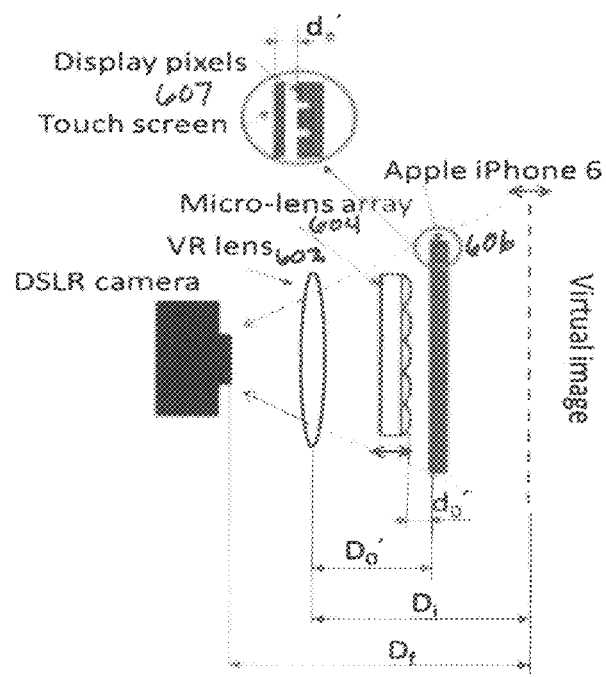
FIG. 6 schematically illustrates a verification experiment set-up in accordance with embodiments of the invention.
Figure 7A:
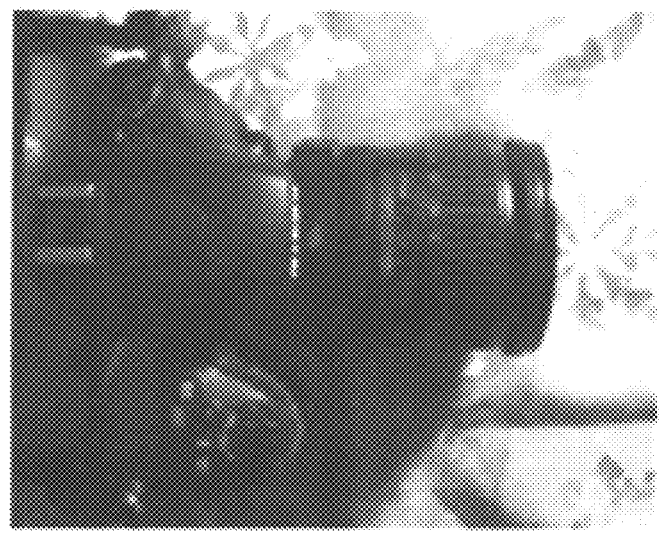
FIG. 7a shows a picture of a DSLR camera that was used to record virtual images from a display for a lens array at different distances to the display.
Figure 7B:
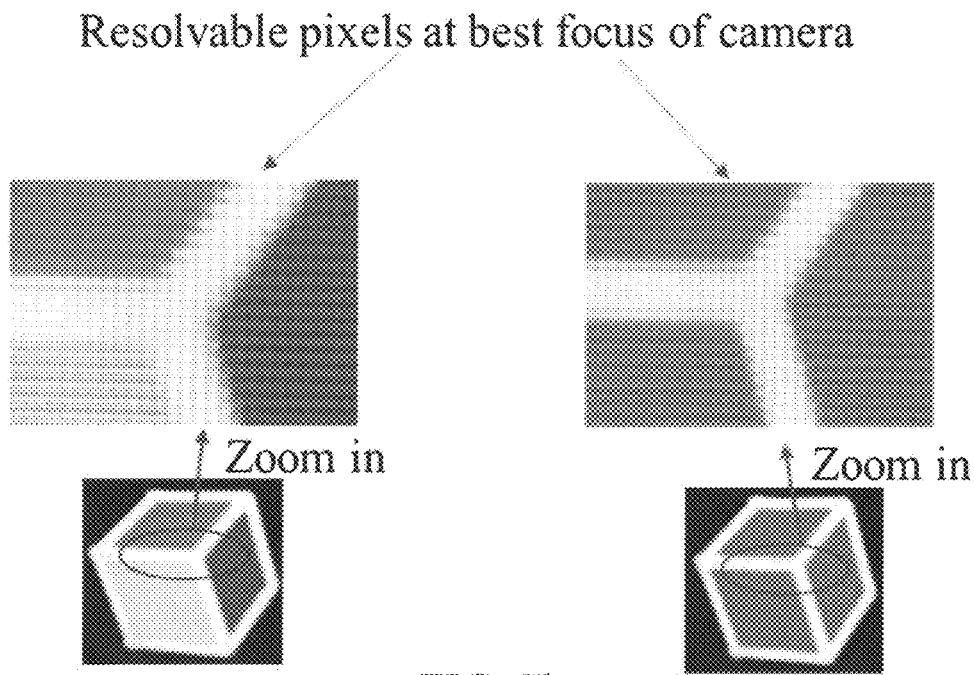
Figure 7C:
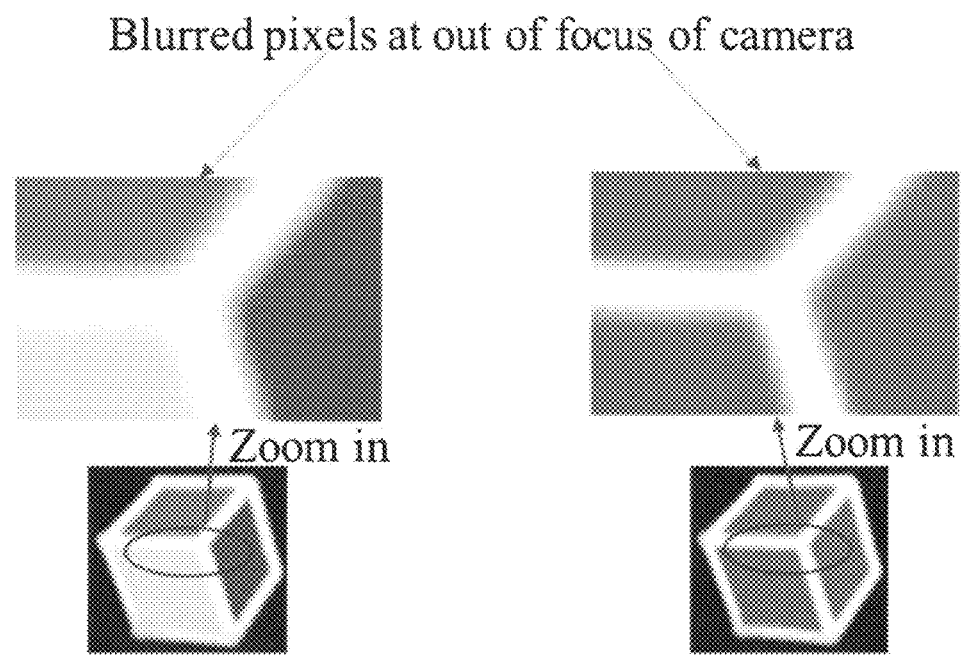
FIG. 7c shows pictures that were taken with the camera at out of focus of the camera, where the pixels of the cubes in the pictures were blurred, according to illustrative embodiments of the invention.

A schematic diagram of the verification experiment set-up is shown in FIG. 6, where the VR lens 602 was an off-the-shelf Google Cardboard lens in Experiment I and an off-the-shelf Fresnel lens in Experiment II. An off-the-shelf micro-lens array 604 (produced by RPC Photonics, part number: MLA-S100-f28-A-2S) was placed in front of (to the left of) an Apple iPhone 6, which was used as the display 606. The size of each lenslet in the lens array 604 is 0.1×0.1 mm, while the size of the display pixel 607 is about 0.08×0.08 mm; thus each lenslet is slightly larger than each pixel on the display. The focal length, $f_a$, of each lenslet is 2.8 mm. Each lenslet has a single side spherical convex surface (as illustrated) and is advantageously made of polymer having a thickness of 0.02 to 0.2 mm on a glass substrate with thickness of 2 mm. The lenslet side of the array was facing the display as illustrated. The overall size of the array is 50.8×50.8 mm. The lens array was mounted on a precision translation stage so that its distance to the screen could be adjusted. Because there is a touch screen glass in front of the display pixels in an iPhone 6, we can assume the optical equivalent distance from the front end of the touch screen to the display pixels is $d_e'$, which was estimated to be <1 mm. Because each lenslet in the lens array has a long focal length ($f_a$=2.8 mm), in both experiments the distance, $d_0'$, between the lens array and the screen of the display was changed from 0 to 1.2 mm to ensure $d_0' < f_a$ in Equation (1) for the virtual image case; here $d_0 = d_0' + d_e'$, while the distance, $D_0'$, between the VR lens and the display screen was kept unchanged. A DSLR camera (Nikon D610 with a Nikon Zoom lens (18-200 mm)) shown in FIG. 7a was used to record the virtual images from the display for the lens array at different distances to the display. The distances, $D_i$, of the virtual images to the VR lens were reflected by the best focal distances, $D_f$, of the DSLR camera to take the pictures. Here $D_f \approx D_i$ since the camera was placed very close (almost touching) to the VR lens. $D_f$ is also the accommodation (or focal) distance of a viewer's eye when the viewer is seeing the virtual image of the display through the VR lens. In the experiments two cube images with different colors were generated, one at a time, on the display for the camera to take their virtual images (one at a time) through the VR lens and lens array. FIGS. 7b and 7c show two examples of pictures acquired by the DSLR camera. FIG. 7b shows that the pictures were taken at the best focus of the camera where the pixels (graininess) of the cubes in the pictures are resolvable when the pictures were zoomed in. FIG. 7c shows that the pictures were taken at out of focus of the camera, where the pixels of the cubes in the pictures were blurred.

Experiment I—Google Cardboard Lens as VR Lens

Figure 2A:
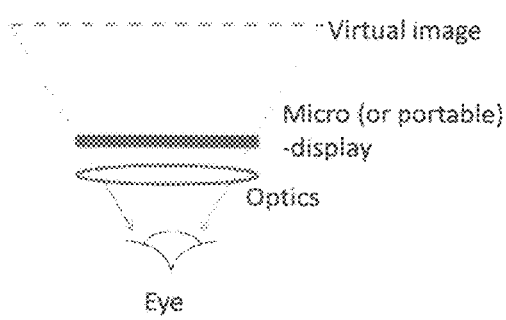
Figure 2B:
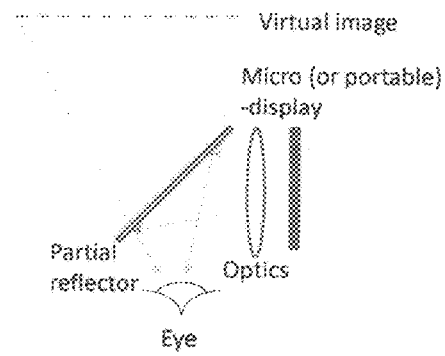
Figure 3A:
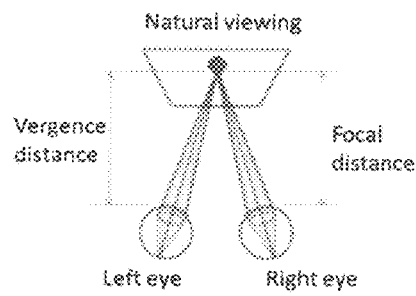
FIGS. 3a and 3b, respectively, represent differences between natural viewing and stereo viewing.
Figure 3B:
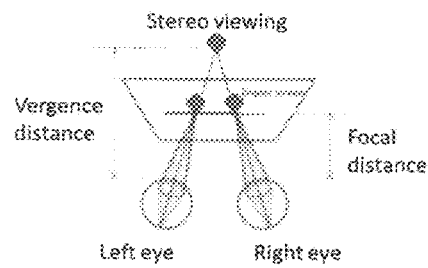
Figure 8:
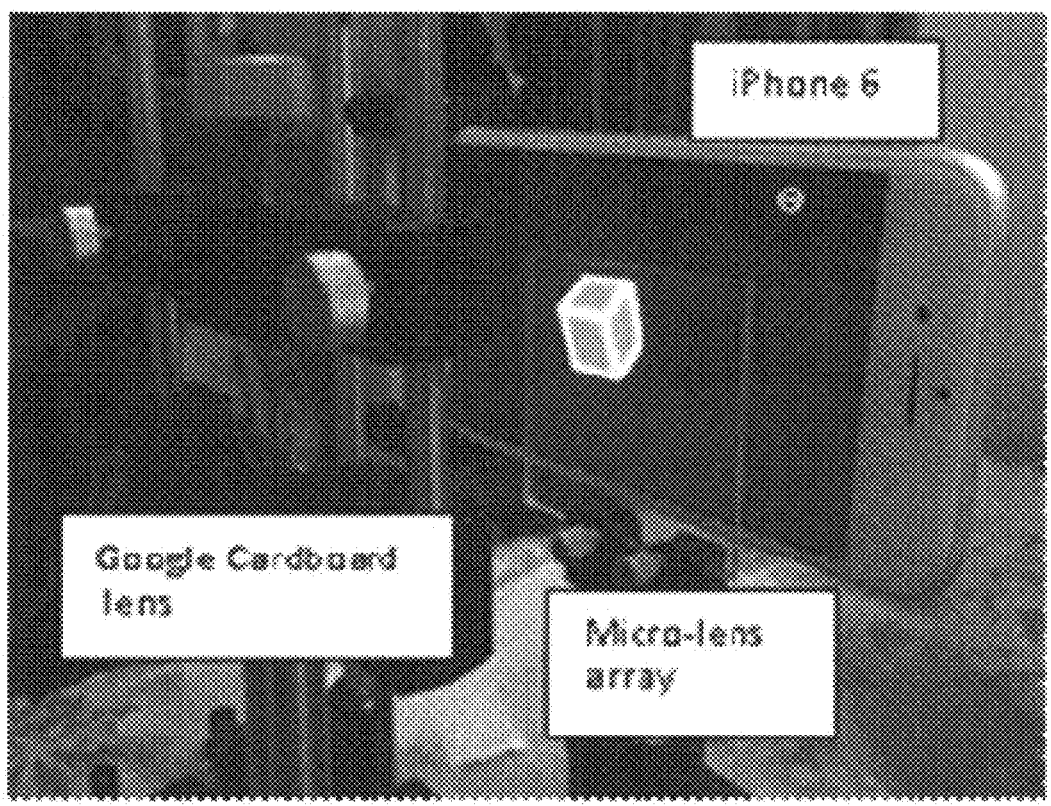
FIG. 8 shows a picture of an experimental setup of a near-eye display for one eye, in accordance with embodiments of the invention.

FIG. 8 shows a picture of an experimental setup of a near-eye display for one eye. The Google Cardboard lens was from BrizTech Ltd and purchased from Amazon.com. The lens was mounted on a multi-axis precision micro-stage for alignment with the cube target on the display and distance adjustment to the display screen. The lens has a focal length, $f_b$, of 45 mm and a diameter of 25 mm. The entire setup follows the schematic diagram shown in FIG. 6 and represents a conventional VR near eye display if without the micro-lens array that is shown in FIG. 2a.

As described above, in the experiments the distance between the micro-lens array and the display screen, $d_0'$, was changed while keeping the distance, $D_0'$, between the Google Cardboard lens and the display screen unchanged. Due to the focal length of the VR lens, $f_b$=45 mm, $D_0'$ was set at 42 mm to ensure it met the requirement of Equation (3). Using the Nikon DSL camera to view the cube image on the screen (one cube at a time) through the Google Cardboard lens and the micro-lens array, the camera was adjusted to best focus to take the pictures of the cubes (one at a time). The best focus distance of the camera was recorded. Following are the details of the experiments.

1. Move the micro-lens array so that it touches the display screen ($d_0'$=0). Take pictures of the cubes (one at a time) with the best focus and record the focusing distance. FIG. 9(a) shows the lens window of the DSLR camera for the focusing distance, which is at about 0.75 m, and FIG. 9(b) shows two pictures taken one at a time of two cubes with the camera at the best focus. To show the details, the pictures were zoomed in and cropped so that the pixels could be seen on the pictures. This indicates that the virtual images of the cubes on the display screen were located at about 0.75 m away from the camera (or viewer's eye) when they were seen through the Google Cardboard lens and the micro-lens array.

For comparison, the pictures of the same cubes were also taken using the camera with the lens focused at infinity (∞, not the best focus), which are shown in FIGS. 10(a) and (b). FIG. 10(b) shows that the pixels of the pictures are blurred with the camera lens focusing at infinity, which indicates that the camera lens was defocused and the virtual images of the cubes were not at ∞.

2. Move the micro-lens array 0.5 mm away from the iPhone screen ($d_0'$=0.5 mm) and keep all other parameters the same. Adjust the camera to the best focus and take pictures of the cubes through the Goggle cardboard lens and the micro-lens array, whose results are shown in FIGS. 11a and 11b. FIGS. 11a and 11b indicate that the virtual images of the targets were re-located to 1.5 m away from the camera (or viewer's eye) by simply moving the micro-lens array 0.5 mm away from the display screen.

3. Move the micro-lens array another 0.5 mm away from the display screen ($d_0'$=1 mm) and keep everything else the same. Using the camera with the best focus to take pictures of the cubes through the Goggle cardboard lens and the micro-lens array, the best focus was at about 4 m (a bit less than 15 feet), as shown in FIGS. 12a and 12b. The pictures indicate that the positions of the virtual images of targets on the display screen were changed to 4 m away from the camera (or viewer's eye) by moving the micro-lens array from the screen 1 mm.

4. Move the micro-lens array another 0.2 mm away from the display screen ($d_0'$=1.2 mm) and keep everything else the same. Adjust the camera to the best focus to take pictures of the targets through the Goggle cardboard lens and the micro-lens array, whose results are shown in FIGS. 13a and 13b. FIG. 13a shows that the position of the virtual images of the targets on the display screen has changed to ∞.

This experiment shows that the positions of the virtual images of targets on the display screen can be changed from 0.75 m to infinity by just moving the micro-lens array 1.2 mm away from the screen using this experimental setup. The movement ranges of the virtual images and the micro-lens array depend on the optical power of the VR lens and the lenslets of the micro-lens array that follow Equation (1)-(4). Generally, the higher the optical power of the VR lens and/or the lenslets, the shorter the movement of the micro-lens array for the same movement range of the virtual images.

Experiment II—Fresnel Lens as VR Lens

Figure 14:
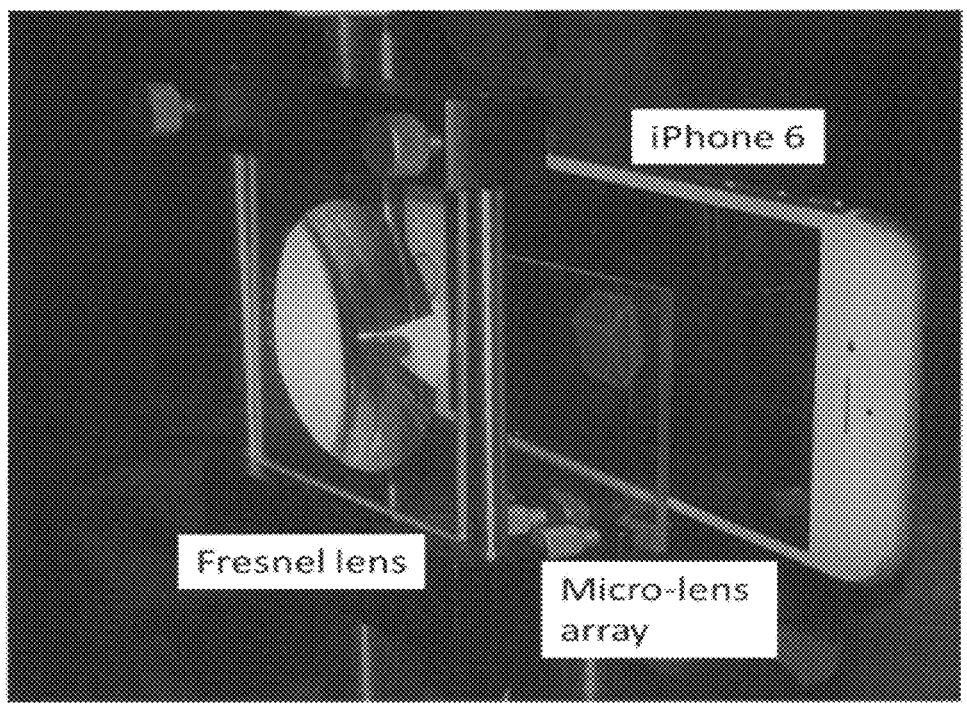
FIG. 14 shows an alternative experimental set-up with a Fresnel lens used as the VR lens in this experiment. The same Nikon DSL camera was used for recording the results.

An off-the-shelf Fresnel lens (Part #3.3 from Fresnel Technologies, Inc.) with focal length $f_b$=51 mm was used as the VR lens in this experiment. The lens was made of Acrylic with the lens diameter of 50 mm and overall size of 64×64×1.5 mm. Everything else was kept the same as in Experiment I. FIG. 14 shows the experimental set-up. The same Nikon DSL camera was used for recording the results.

Following are the details of the experiment.

1. Move the micro-lens array until it touches the display screen ($d_0'=0$). Set up the distance between the Fresnel lens and the display screen at about 47 mm ($D_0'=47$ mm) to satisfy Equation (3). Use the camera to take pictures of the targets with the best focus through the Fresnel lens and the micro-lens array, as shown in FIGS. 15a and 15b. The best focus distance of camera indicates that the virtual image of the display screen was located at 1 m away from the camera (or viewer's eye).
2. Move the micro-lens array 0.5 mm away from the display screen ($d_0'=0.5$ mm) and keep everything else the same. Use the camera with the best focus to take pictures of the targets through the Fresnel lens and the micro-lens array. The best focus is at about 1.5 m (5 feet), as shown in FIGS. 16a and 16b.
3. Move the micro-lens array another 0.5 mm away from the display screen ($d_0'=1$ mm) and keep everything else the same. Use the camera with the best focus to take pictures of the targets through the Fresnel lens and the micro-lens array, whose results are shown in FIGS. 17a and 17b. FIG. 17a indicates the location of virtual images of targets were at greater than 3 m away from the camera (or viewer).
4. Move the micro-lens array another 0.2 mm away from the display screen ($d_0'=1.2$ mm) and keep everything else the same. Use the camera with the best focus to take pictures of the targets through the Fresnel lens and the micro-lens array. FIGS. 18a and 18b show the results, which indicate that the virtual images were now located at close to $\infty$.

This experiment shows that the positions of the virtual images of the targets on the display screen can be changed from 1 m to (close to) infinity by moving the micro-lens array just 1.2 mm away from the screen. We also see that due to the weaker optical power of the Fresnel lens compared to the Google Cardboard lens, the movement range of the virtual images of the targets is smaller than that in Experiment I with the same movement of the micro-lens array.

Both experiments verified that by placing a movable micro-lens array in front of the display screen and effecting a small movement, a relatively large positional change of the virtual image can be realized in the optical path (z) direction that will be seen by the viewer in a VR (or AR) system. Therefore, the accommodation (or focal) distance is adjustable for both systems. Here, all the components and devices used were available off-the-shelf; they were not optimized for the best image quality. Both the Google Cardboard lens and the Fresnel lens used here had large field curvature and distortion, the Google Cardboard lens being worse. The image quality could be further improved by optimizing the micro-lens array and VR (or AR) optical system to the display screen.

There are two methods to eliminate or mitigate accommodation-vergence conflict:

1. With the stereoscopic method for 3D imaging, one could set up different accommodation distances ($D_i$—locations of the virtual images that the viewer will see) to reach comfortable vergence distances by moving the micro-lens array based on the ZoC. For example, we can move the micro-lens array to make the virtual image (accommodation) distance ($D_i$) 1 m for comfort vergence distances of the 3D image from 0.5 m to 1.5 m and, then, at 10 m for comfort vergence distances from 1.5 m to infinity based on the ZoC.
2. An image on a display can be expressed as $$\Sigma I_i(x_i, y_i, t) = \Sigma(I_i^R(x_i, y_i, t) + I_i^G(x_i, y_i, t) + I_i^B(x_i, y_i, t)) \quad (5)$$

where $I_i(x_i, y_i, t)$ represents the light intensity on the $i^{th}$ pixel at location ($x_i$, $y_i$) and time t. (R, G, B) represent red, green and blue colors respectively. The image on the display is represented in 2D (x and y) dimensions (perpendicular to the optical, z, axis). When the display has a movable micro-lens array in front of it, the virtual image of the display through the micro-lens array can be expressed as:

$$\Sigma I'_i(x_i, y_i, z(t), t) = \Sigma(I'^R_i((x_i, y_i, z(t), t) + I'^G_i(x_i, y_i, z(t), t) + I'^B_i(x_i, y_i, z(t), t)) \quad (6)$$

Where $I'_i(x_i, y_i, z(t), t)$ represents the light intensity of the virtual image of the $i^{th}$ pixel on the display at location ($x_i$, $y_i$, $z(t)$) and time t. The image is now represented in the z dimension (also the optical axis) as well as the x and y dimensions. It is possible to time-modulate the micro-lens array movement so that z(t) can be changed in a manner to make a true 3D virtual image of display expressed in Equation (6).

Other benefits of placing the micro-lens array in front of the micro-display include:

1. The lens elements will collect more light from the display pixels, so the brightness of the near-eye display will be improved, which is very helpful for AR applications.
2. If adding lateral movement of the lens array in the x and y directions, it may reduce the screen-door effect (SDE) that happens in almost all the current versions of VR systems. The SDE is a grid of fine lines one may see when you have your face in VR, as if looking out of a screen door. That grid is actually the space between pixels. If the lens array is vibrated along the x and y directions with an amplitude of about the spacing between pixels and with a suitable frequency (e.g., >30 Hz), such movement could blur the grid lines to reduce the SDE without degradation of image quality.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited. In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

I claim:

1. A 3D display apparatus, comprising:
   a display screen component comprising a display screen pixel array adapted to display a display screen image;
   a microlens imaging component comprising an array of microlenses corresponding to the display screen pixel array disposed directly adjacent the display screen component such that the microlens imaging component can form a virtual or a real image of the display screen image; and
   a controllable movement component coupled to at least one of the imaging component and the display screen, wherein the imaging component and the display screen are controllably movable relative to each other,
   further wherein upon a controlled movement of the imaging component relative to the display screen, a location of the virtual or real image along an optical axis is controllably changed.

2. The 3D display apparatus of claim 1, wherein the display screen is in a fixed location and the microlens imaging component is movable.

3. The 3D display apparatus of claim 2, wherein the microlens imaging component is movable in a plane, x-y, perpendicular to an optical, z, axis in front of the display screen.

4. The 3D display apparatus of claim 2, wherein the microlens imaging component is movable along an optical, z, axis in front of the display screen.

5. The 3D display apparatus of claim 4, wherein the microlens imaging component is movable in a plane, x-y, perpendicular to an optical, z, axis in front of the display screen.

6. The 3D display apparatus of claim 1, wherein the microlens imaging component is in a fixed location and the display screen is movable.

7. The 3D display apparatus of claim 6, wherein the display screen is movable in a plane, x-y, perpendicular to an optical, z, axis behind the microlens imaging component.

8. The 3D display apparatus of claim 6, wherein the display screen is movable along an optical, z, axis behind the microlens imaging component.

9. The 3D display apparatus of claim 8, wherein the display screen is movable in a plane, x-y, perpendicular to an optical, z, axis behind the microlens imaging component.

10. The 3D display apparatus of claim 1, wherein both the microlens imaging component and the display screen are movable.

11. The 3D display apparatus of claim 10, wherein the microlens imaging component is movable along an optical, z, axis in front of the display screen, and the display screen is movable in a plane, x-y, perpendicular to an optical, z, axis behind the microlens imaging component.

12. The 3D display apparatus of claim 10, wherein the microlens imaging component is movable in a plane, x-y, perpendicular to an optical, z, axis in front of the display screen, the display screen is movable along an optical, z, axis behind the microlens imaging component.

13. The near-eye display apparatus of claim 1, wherein each of the microlenses has a lateral dimension between 0.5× and 2× a lateral dimension of a single display pixel.

14. The near-eye display apparatus of claim 1, wherein each of the microlenses has a lateral dimension that is equal to the lateral dimension of a single corresponding display pixel.

15. The near-eye display apparatus of claim 1, wherein the pitch of the microlenses is equal to or larger than the lateral dimension of each of the microlenses.

16. A near-eye display system, comprising:
a 3D display apparatus, comprising:
a display screen component comprising a display screen pixel array adapted to display a display screen image;
a microlens imaging component comprising an array of microlenses corresponding to the display screen pixel array disposed directly adjacent the display screen component such that the microlens imaging component can form a virtual or a real image of the display screen image; and
a controllable movement component coupled to at least one of the imaging component and the display screen,
wherein the imaging component and the display screen are controllably movable relative to each other; and
a viewing lens fixedly disposed adjacent the microlens imaging component,
wherein a final virtual image of the display that is viewable by a viewer will be formed by the viewing lens at a controllably variable distance, $D_i$, from the viewing lens relative to a movable position of the microlens imaging component, where $D_i$, is the accommodation distance of the viewer's eye.

17. The near-eye display system of claim 16, wherein the viewing lens is a positive lens system comprising at least a piece of positive lens including a Fresnel lens or a group of lenses to form a positive lens group.

18. The near-eye display system of claim 16, wherein the movement of microlens imaging component along the z-axis is time modulated (z(t)) in the manner so that the corresponding final virtual images from the viewing lens can form a 3D image viewable by the viewer.

19. A method for displaying an image, comprising:
providing a near-eye display system, comprising:
a near-eye display apparatus, further comprising:
a display screen component comprising a display screen pixel array adapted to display a display screen image;
a microlens imaging component comprising an array of microlenses corresponding to the display screen pixel array disposed directly adjacent the display screen component such that the microlens imaging component can form a virtual or a real image of the display screen image; and
a controllable movement component coupled to at least one of the imaging component and the display screen,
wherein the microlens imaging component and the display screen are controllably movable relative to each other; and
a viewing lens fixedly disposed adjacent the microlens imaging component, so as to form a final virtual image of the display at a controllably variable distance, $D_i$, from the viewing lens; and
moving the microlens imaging component relative to the display screen component to vary the distance, $D_i$, and thus controllably change the accommodation distance of the viewer's eye.

20. The method of claim 19, further comprising:
time modulating the movement of microlens imaging component along the optical, z, axis (z(t)) in the manner so that the corresponding final virtual images from the viewing lens form a 3D image viewable by the viewer.

* * * * *